(12) United States Patent
Algren et al.

(10) Patent No.: US 7,320,192 B2
(45) Date of Patent: Jan. 22, 2008

(54) MOTORIZED GRAIN SCOOP

(76) Inventors: Barry Algren, 2690 170th Ave., Sherrard, IL (US) 61281; Michael Asher, 1705 Highway 164, Galesburg, IL (US) 61401

( * ) Notice: Subject to any disclaimer, the term of this patent is extended or adjusted under 35 U.S.C. 154(b) by 293 days.

(21) Appl. No.: 10/772,811

(22) Filed: Feb. 5, 2004

(65) Prior Publication Data

US 2005/0172594 A1    Aug. 11, 2005

(51) Int. Cl.
*E01H 5/09* (2006.01)
(52) U.S. Cl. .......................... 37/256; 37/264
(58) Field of Classification Search ............... 56/1; 37/264, 246, 252, 249, 248, 256; 239/679, 239/658, 673, 681, 686, 668, 669
See application file for complete search history.

(56) References Cited

U.S. PATENT DOCUMENTS

| | | | | |
|---|---|---|---|---|
| 2,910,819 A | * | 11/1959 | Helliwell | 56/220 |
| 3,085,832 A | * | 4/1963 | Guillemette | 37/256 |
| 3,153,476 A | | 10/1964 | Barendsen et al. | |
| 3,452,460 A | * | 7/1969 | Cope et al. | 37/233 |
| 3,484,963 A | | 12/1969 | Heth et al. | |
| 3,592,393 A | | 7/1971 | Sinden | |
| 3,592,394 A | | 7/1971 | Sinden | |
| 3,603,008 A | * | 9/1971 | Heth | 37/252 |
| 4,158,923 A | * | 6/1979 | Steiner et al. | 37/256 |
| 4,190,972 A | * | 3/1980 | Berner | 37/246 |
| 4,203,237 A | * | 5/1980 | Enters et al. | 37/233 |
| D262,797 S | * | 1/1982 | Arthur et al. | D15/12 |
| 4,329,792 A | * | 5/1982 | Berner | 37/246 |
| 4,408,720 A | | 10/1983 | Anderson et al. | |
| 4,951,403 A | * | 8/1990 | Olmr | 37/262 |
| 5,016,822 A | | 5/1991 | Dutschke | |
| RE33,726 E | * | 10/1991 | Thorud et al. | 37/244 |
| 5,190,140 A | * | 3/1993 | Buschbom | 198/642 |
| 5,735,064 A | * | 4/1998 | Holl | 37/260 |
| 5,860,604 A | | 1/1999 | Kooiker | |
| 5,966,846 A | * | 10/1999 | Harms et al. | 37/249 |

FOREIGN PATENT DOCUMENTS

GB           2178287 A  *  2/1987

* cited by examiner

*Primary Examiner*—Árpád Fábián Kovács
(74) *Attorney, Agent, or Firm*—Marshall, Gerstein & Borun LLP

(57) ABSTRACT

An apparatus for moving particulate matter includes a body having a drive mechanism that operatively connects a motor to a shaft of a paddle assembly. A drive housing is disposed on the body and houses the drive mechanism. A cavity having a first side, a second side, and at least a partial semi-circular cross-sectional shape is disposed in the body, and the paddle assembly includes the shaft and a plurality of paddles disposed therefrom. Each paddle includes a bottom wall that is sized and shaped to extend along a width of the paddle in a substantially planar manner between the first side wall and the second side wall of the cavity, and a distal end that travels along the semi-circular cross-sectional shape of the cavity during operation.

23 Claims, 6 Drawing Sheets

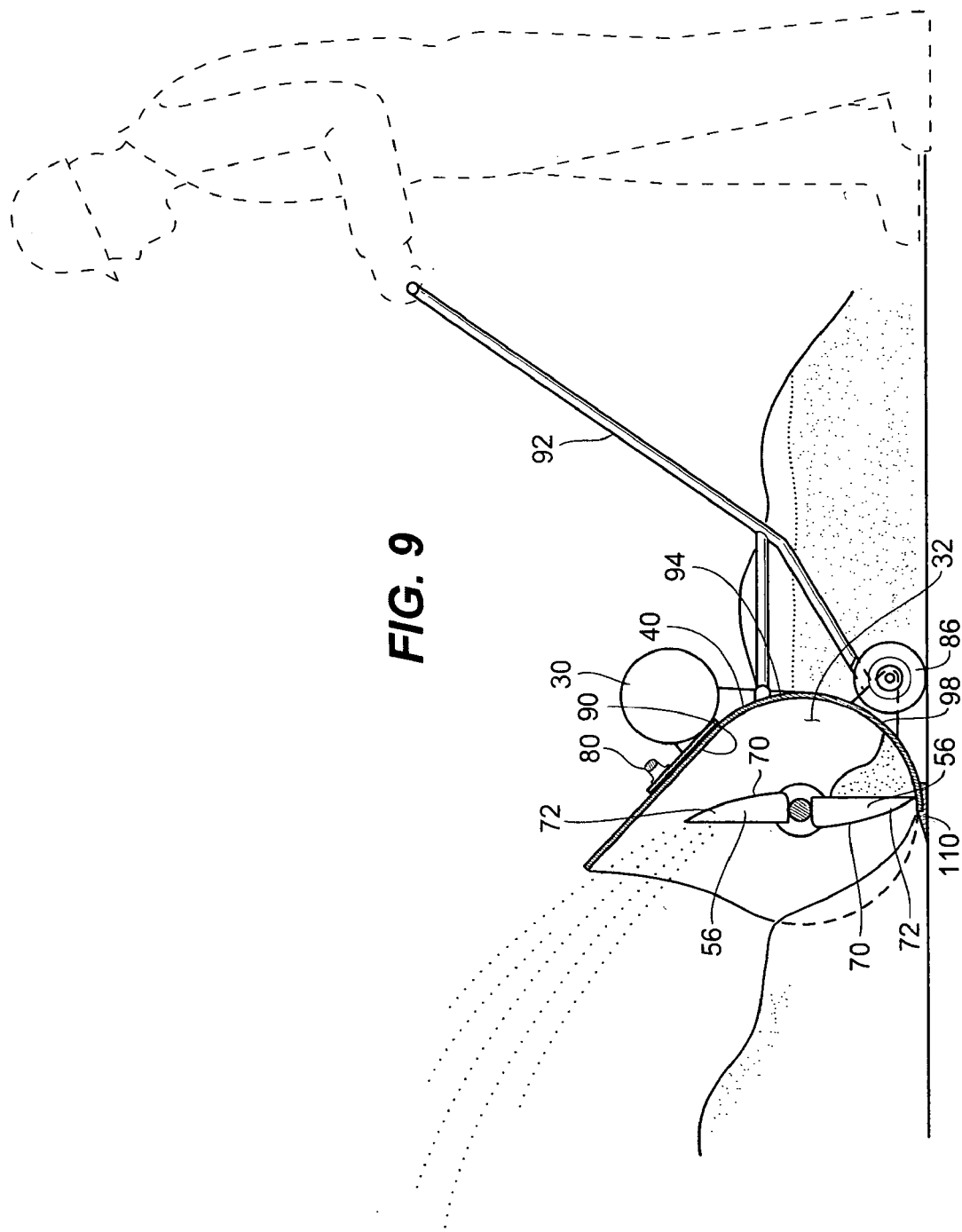

US 7,320,192 B2

MOTORIZED GRAIN SCOOP

TECHNICAL FIELD

The present disclosure relates generally to a motorized apparatus for moving particulate matter and, more particularly, to a motorized grain scoop for transferring grain from a first location to a second location.

BACKGROUND OF THE DISCLOSURE

Shovels, and more particularly, grain shovels, are generally known in the art. Such manual shovels are used for moving particulate matter from one location to another in all types of application, including moving grain to-and-from and/or within grain silos, grain repositories, and the like.

More specifically, some grain repositories include augers located near the bottom of the repository for moving large quantities of grain from and/or within the repository. Such repositories may include slanted or angled bottom areas to guide the grain toward the augers. Regardless of whether the bottom areas are slanted or not, a large amount of grain often needs to be manually moved toward the augers in order to remove all of the grain from the repository. As such, the user utilized a shovel, broom, or the like, to move the grain from one location to another, and more specifically, used a grain shovel to heave and/or push the grain into the augers.

These current manual methods of moving grain to-and-from and/or within the grain repositories are physically demanding and may be dangerous at times. For example, grain is heavy and moving grain with a shovel can be tiresome, cause back problems, and/or take long periods of time to accomplish the task at hand. Similarly, moving grain into an auger can be dangerous as the auger is a large mechanical rotating device able to inflict serious injury on the user if proper precautions are not taken.

SUMMARY OF THE DISCLOSURE

In accordance with one aspect of the disclosure, an apparatus for moving particulate matter is disclosed. The apparatus includes a body having a motor, a cavity having a first side, a second side, and at least a partial semi-circular cross-sectional shape, and a drive housing disposed on the body. The apparatus further includes a paddle assembly including a shaft having a plurality of paddles disposed therefrom. Each paddle has a bottom wall that is sized to extend between the first side and the second side of the cavity, and a distal end that travels along the semi-circular cross-sectional shape of the cavity during operation. A drive mechanism that is disposed in the drive housing operatively connects the motor and the main shaft.

In accordance with another aspect of the disclosure, an apparatus for moving particulate matter is disclosed. The apparatus includes a body having a motor, a cavity having a first side, a second side, and at least a partial semi-circular cross-sectional shape, and a drive housing disposed on the body. The apparatus further includes a paddle assembly including a shaft having a plurality of paddles disposed therefrom. Each paddle has an arcuate bottom wall that extends outwardly from the shaft first away from and then toward the direction of rotation of the paddles, a pair of side walls, and a distal end that travels along the semi-circular cross-sectional shape of the cavity during operation. A drive mechanism that is disposed in the drive housing operatively connects the motor and the main shaft.

In accordance with another aspect of the disclosure, an apparatus for moving particulate matter is disclosed. The apparatus includes a body having a motor, and a cavity having at least a partial semi-circular cross-sectional shape. The apparatus further includes a paddle assembly having a shaft and a plurality of paddles. The plurality of paddles is disposed on the shaft and includes distal ends that travel along the semi-circular cross-sectional shape of the cavity during operation. A drive mechanism operatively connects the motor and the shaft, and is fully enclosed by the drive housing, thereby preventing particulates from contaminating the drive mechanism.

BRIEF DESCRIPTION OF THE DRAWINGS

FIG. 9 is a cross-sectional view of the motorized grain scoop as seen in FIG. 2 during operation.

Figure 1:
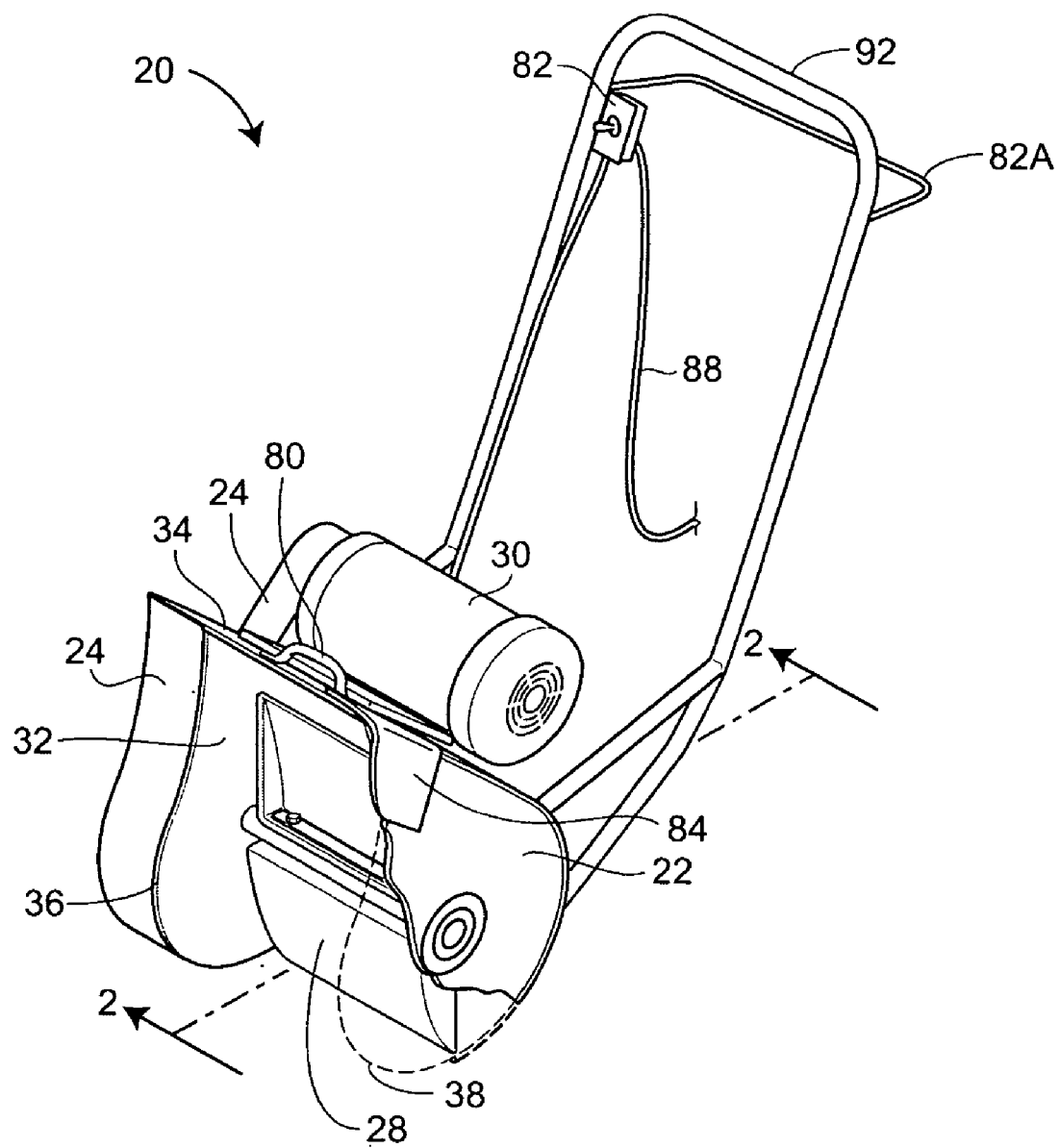
FIG. 1 is an isometric view of a motorized grain scoop according to one embodiment of the disclosure.

While the method and device described herein are susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the disclosure as defined by the appended claims.

DETAILED DESCRIPTION

Referring now to the drawings, and with specific reference to FIG. 1, a motorized grain scoop as constructed in accordance with the teachings of the disclosure is generally depicted by reference numeral 20. As shown therein, the motorized grain scoop 20, in this exemplary embodiment, includes a body 22, a drive housing 24, a drive mechanism 26 (FIGS. 3 and 4), a paddle assembly 28, and a motor 30.

Figure 2:
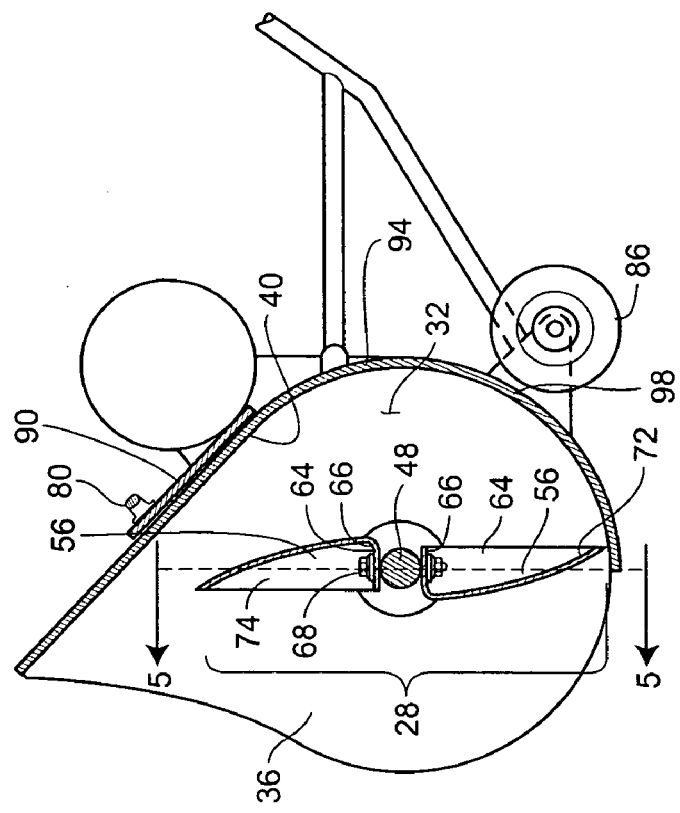
FIG. 2 is a cross-sectional view of the motorized grain scoop along lines 2-2 of FIG. 1.

The body 22, as illustrated in FIG. 1, may be constructed from a number of materials, including but not limited to, plastics, metals, composites, wood, and/or a combination thereof, and includes a cavity 32, disposed toward a front 34 of the body 22. The cavity 32 includes a first side wall 36, a second side wall 38, and a rear wall 40 (FIG. 2). The first and second side walls 36, 38 are oriented generally parallel to each other, and the rear wall 40 is oriented generally perpendicular to both the first and second side walls 36, 38. The first and second side walls 36, 38 are generally planar, whereas the rear wall 40 has an arcuate shape. More specifically, as best seen in FIG. 2, the rear wall has a semi-circular shape, sized and shaped to correspond with at least a portion of the paddle assembly 28. As such, the first and second side walls 36, 38, and the rear wall 40 define the cavity 32. The cavity 32 and, more specifically, the rear wall 40 of the cavity 32 will be discussed in more detail below in conjunction with the paddle assembly 28.

Figure 3:
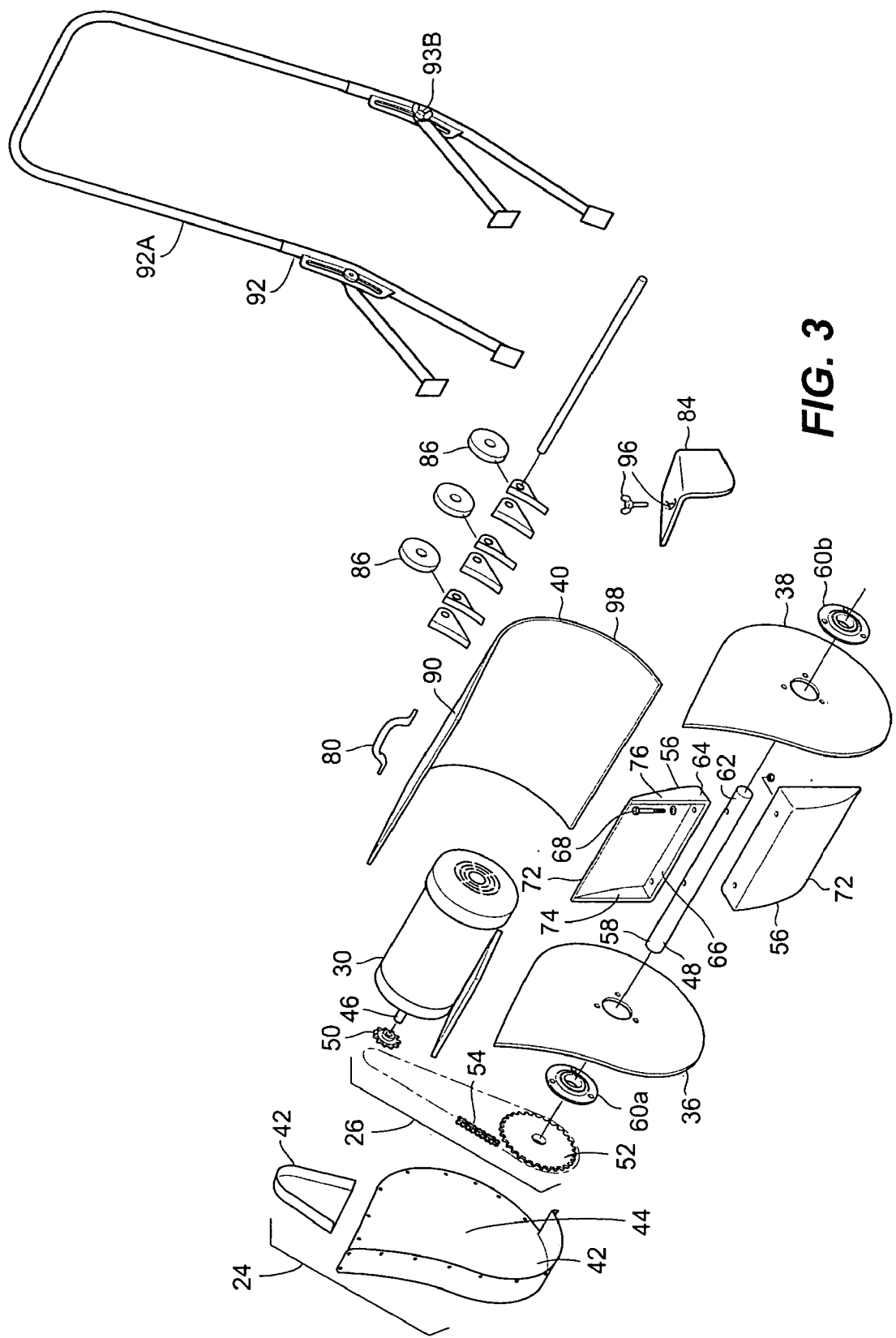
FIG. 3 is an exploded isometric view of the motorized grain scoop of FIG. 1.

The drive housing 24, as seen in FIGS. 1 and 3, may be disposed on or near the body 22, and as in this exemplary embodiment, may be attached to the body 22 near the first side wall 36. The drive housing 24, as the name suggest, is adapted to house the drive mechanism 26, and more specifically, may be adapted to protect the drive mechanism 26 from dirt or other particulates, such as grain, dust, etc. As seen in FIGS. 1 and 3, the drive housing 24 may have the same general shape of the body 22, and may be an extension thereof. As such, the drive housing 24 may be wholly or at least partially integral to the body 22, and may include one or more removable covers 42. The drive housing 24 may, however, be a separate unit to the body 22. To ensure that the drive mechanism 26 remains clean and functioning properly, the drive housing 24 may be constructed, and/or sealed in such a manner that substantially no dirt or other particulates can enter the drive housing 24. For example, the various portions that define the drive housing 24 may be tightly connected thereby leaving no gaps or holes, and/or the connections of the various portions may include a seal, caulk or other material to eliminate substantially all the gaps and holes leading to an interior 44 of the drive housing 24.

Figure 4:
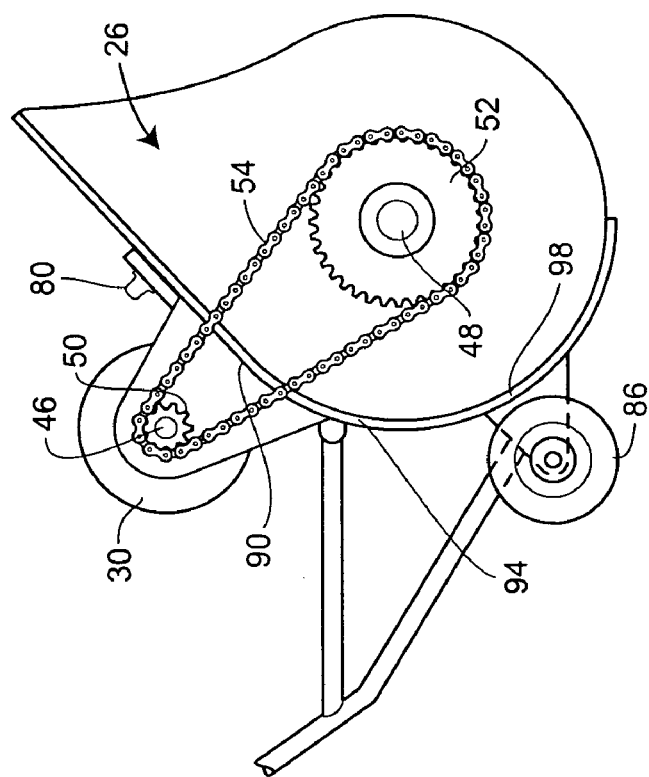
FIG. 4 is a side view of the of the motorized grain scoop of FIG. 1, with a drive housing partially removed.

The drive mechanism 26, as seen in FIGS. 3 and 4, operatively connects the motor 30 to the paddle assembly 28, and more specifically, connects a shaft 46 extending from the motor 30 to a shaft 48 of the paddle assembly 28. The drive assembly 26 may include a first cogwheel 50, a second cogwheel 52, and a connecting member 54. The first and second cogwheels 50, 52 may be sprockets, pinions, gears, or a combination thereof, and the connecting member 54 may be a chain, belt, or any other type of connecting member able to transmit a force between the first cogwheel 50 and the second cogwheel 52. The first cogwheel 50, in this exemplary embodiment the first sprocket 50, may be fixedly attached to the shaft 46 of the motor 30. The motor 30 may thereby provide rotation to the drive mechanism 26 through the shaft 46 and the first sprocket 50. The second cogwheel 52, in this exemplary embodiment the second sprocket 52, may be fixedly attached to the shaft 48 of the paddle assembly 28. The drive mechanism 26 may thereby provide rotation to the paddle assembly 28 through the second sprocket 52 and the shaft 48. The first and second sprockets 50, 52 may be of equal or similar diameter, or may be of different diameters. For example, the first sprocket 50 may be larger in diameter than the second sprocket 52, thereby achieving a speed increase between the rotation of the shaft 46 of the motor 30 and the rotation of the shaft 48 of the paddle assembly 28. Conversely, the first sprocket 50 may be smaller in diameter than the second sprocket 52, thereby achieving a speed reduction between the rotation of the shaft 46 of the motor 30 and the rotation of the shaft 48 of the paddle assembly 28. Additionally, and/or alternatively, the drive mechanism 26 may include additional cogwheels and/or additional connecting members to operatively connect the motor 30 to the paddle assembly 28. In an alternate embodiment, the drive mechanism 26 may be entirely eliminated, and as such, the motor 30 may be directly connected to the paddle assembly 28, and more specifically, the shaft 46 of the motor 30 may be the same shaft as the shaft 48, or may be directly connected to the shaft 48 of the paddle assembly 28.

The paddle assembly 28, as best seen in FIGS. 2 and 3, includes the shaft 48 and a plurality of paddles 56. A first end 58 of the shaft 48 is disposed in the drive housing 24 and is fixedly attached to the second sprocket 52 (FIG. 3). A pair of bearings 60, the first bearing 60a being disposed in the first side wall 36 and the second bearing 60b being disposed in the second side wall 38, support and/or enable smooth movement of the shaft 48 in the body 22. As such, a second end 62 of the shaft 48 is disposed in the second bearing 60b, leaving the majority of the shaft 48 disposed in the cavity 32 of the body 22.

The one or more paddles 56, as best seen in FIGS. 2 and 3, are disposed on the shaft 48, and more specifically, extend radially outward from the shaft 48. A proximal end 64 of the paddles 56 is fixedly attached to the shaft 48 at a rear wall 66 of the paddles 56, and more specifically, may be attached to the shaft 48 with one or more fasteners 68, such as bolts, screws, etc. The paddles 56, as seen in FIG. 6, may further include a bottom wall 70, that extends from the proximal end 64 of the paddles 56 to a distal end 72 of the paddles 56, and a pair of sidewalls 74, 76 that may be disposed on either side of the paddles 56, such that the sidewalls 74, 76 extend from the rear wall 66 or proximal end 64 of the paddles 56 to the distal end 72 of the paddles 56.

Figure 5:
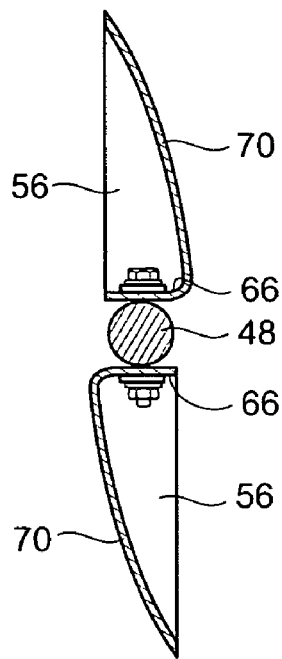
FIG. 5 is a cross-sectional view of a pair of paddles as seen in FIG. 2.

The bottom wall 70, as seen in FIG. 5, has an arcuate cross-sectional shape, as taken along a length of the paddle 56, that extends outwardly from the shaft 48 and then curves toward the direction of rotation of the paddles 56. When combining the bottom wall 70 with the rear wall 66, it may be said that the arcuate bottom wall 70 extends outwardly from the shaft 48 first away from and then toward the direction of rotation of the paddles 56.

Figure 6:
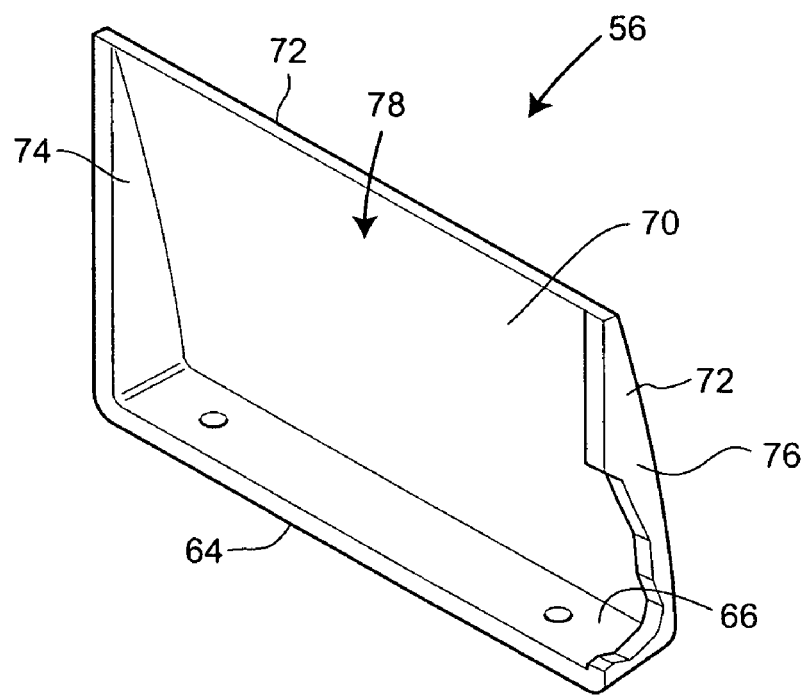
FIG. 6 is an isometric view of a paddle as seen in FIG. 3.

Similarly, the bottom wall 70, as seen in FIG. 6, is substantially planar or linear, as taken along a width of the paddle 56. As such, an open region 78 is created on the paddles 56 that is defined by the rear wall 66, the bottom wall 70, and the pair of side walls 74, 76. For clarity, the width of the paddle 56, as discussed herein, may be defined as the distance between the first side wall 74 and the second side wall 76 of the paddle 56, and/or the distance of the paddle 56 along an axis parallel to the shaft 48 of the paddle assembly 28. Similarly, the length of the paddle 56 may be defined as the distance between the rear wall 66 and the distal end 72 of the paddle 56, and/or the distance of the paddle 56 along an axis perpendicular to the shaft 48 of the paddle assembly 28.

The size and shape of the paddles 56, as best seen in FIGS. 2 and 9, may be designed and/or constructed to correspond to the size and shape of the cavity 32. More specifically, the length of the paddles 56 may be such that the distal ends 72 of the paddles 56, during rotation of the paddle assembly 28, track along and/or correspond to the semi-spherical shape of the rear wall 40 of the cavity 32. Similarly, the width of the paddles 56 may be such the side walls 74, 76 of the paddles 56 extend from the first side wall 36 of the cavity 32 to the second side wall 38 of the cavity 32 (FIG. 1).

Attached to, disposed from, or disposed near the body 22 and/or the drive housing 24 may be the motor 30, a handle 80, a speed control/on-off switch 82, a momentary switch/bar 82a, a chute 84, one or more wheels 86, an electrical connector 88, and/or a handlebar 92, as seen in FIGS. 1, 3, and 9.

In this exemplary embodiment, the motor 30 is disposed on a top 90 of the body 22, and includes the electrical connector or cord 88 for attachment of the motor 30 to an electrical source by a plug (not shown) on the end of the cord 88. In other applications, the motor 30 may be other then electric powered, such as by gasoline, oil, propane, etc., but in this embodiment the motor 30 is a one Horsepower electric motor rated at 1725 rpm and 110 Volt AC.

The handlebar 92, as seen in FIG. 1, may be disposed on the body 22, and more specifically, may be attached to the body 22 near a rear 94 of the body 22 (FIGS. 2 and 4), the drive housing 24, and/or the second side wall 38 of the cavity 32. The handle bar 92 may be fixedly attached to the body 22, with no pivoting motion, such that better control of the motorized grain scoop 20 may be had. The handle bar 92 may, however, include an adjustment mechanism 93 for adjusting the length and/or angle of the handle bar 92 relative to the body 22. More specifically, as seen in FIG. 3, the handle bar 92 may include a telescopic portion 92a and/or pin and channel pivot portion 92b for adjusting the handle bar 92. The speed control/on-off switch 82, may be deposed near or on the motor 30, or may be disposed on the handlebar 92, such that the user may easily reach the speed control/on-off switch 82. The momentary switch/bar 82a, as seen in FIG. 1, may be disposed at or neat the switch 82 and/or the handle bar 92. The momentary switch/bar 82a may also be a component of the switch 82 to eliminate any unnecessary duplication. The momentary switch/bar 82a may be grabbed or held by the user, such that the motorized grain scoop 20 or the motor 30 only functions when the momentary switch/bar 82a is engaged. Once the user releases or disengages the momentary switch/bar 82a, the motorized grain scoop 20 or the motor 30 may cease operation so as not to injure the user.

The chute 84, as seen in FIG. 3, may be disposed near the cavity 32, and in this exemplary embodiment, is located near the top 90 and the second side wall 38. The chute 84 may include an adjustment mechanism 96 to enable the user to guide the particulates being moved by the motorized grain scoop 20 to one or more directions. The motorized grain scoop 20 may include additional chutes 84 (not shown) to provide additional and/or better directional ability.

The one or more wheels 86 may be disposed on or near a bottom 98 and/or the rear of the body 22, as seen in FIGS. 1 and 3. The wheels 86 may have a small diameter as depicted, but may have a larger diameter as well. Similarly, the number of wheels 86 may vary according to the application and size of the wheels 86 used.

The handle 80, may be disposed on or near the top 90 of the body 22, as seen in FIGS. 1 and 3, but may be disposed anywhere on the body 22 reasonable for mounting the handle 30. For example, the handle 30 may be placed in-line with the center of gravity of the motorized grain scoop 20, such that movement and/or transport of the motorized grain scoop 20, with the handle 30, is made easier.

Figure 7:
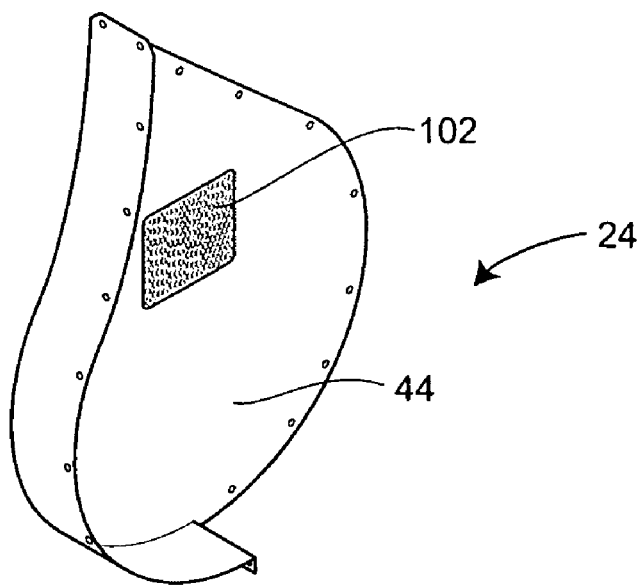
FIG. 7 is an isometric view of a drive housing having an air filter.
Figure 8:
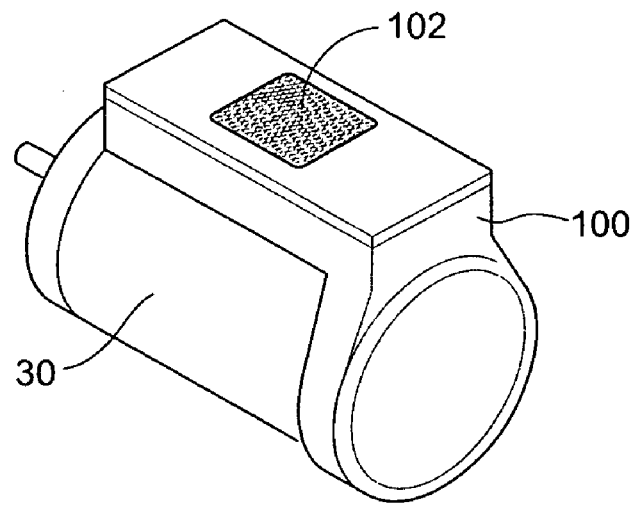
FIG. 8 is an isometric view of a motor having a filtered housing.

The motorized grain scoop 20, and more specifically the drive housing 24 (FIG. 7) and/or a motor housing 100 (FIG. 8), may include one or more air filters 102. For example, as seen in FIG. 7, the drive housing 24 may include an air filter 102 constructed from one or more filter materials that allows for movement of air, e.g., between the interior 44 of the drive housing 24 and the ambient air. Additionally or alternatively, the area that the filter 102 covers may be used as an access point, e.g., to the interior 44 of the drive housing 24. The motor 30 may, however, be already fully enclosed, i.e. a sealed motor, such that no dust or other small particulate matter can enter or affect the inner working of the motor 30. Similarly, as seen in FIG. 8, the motor housing 100 may include an air filter 102 to allow for movement of air between the motor 30 and the ambient air. As such, the motor 30 may be prevented from being clogged or filled with dust particles, and the like, that are present in high concentrations in grain while being able to vent to the ambient air.

The above exemplary embodiment may include many variations thereof to achieve and/or create additional or alternative features. For example, the body 22, the drive housing 24, the drive mechanism 26, the paddle assembly 28, and all of the separate components thereof, may be separate components, or may be integral to each other. For example, the various components of the paddle assembly 28, including the paddles 56 and the shaft 48 may be a single piece. Similarly, the body 22 and drive housing 24 may be a single piece. Therefore, any and/or all pieces of the motorized grain scoop 20 may be integral to each other, or at least attached to one another.

The motorized grain scoop 20 may also include a self-propelled option, which may use the existing motor 30, and/or an additional motor (not shown) to propel the motorized grain scoop 20. In this exemplary embodiment, additional hardware such as cogwheels, chains, belts, shafts, bearings, etc. (all not shown), may be needed to effectuate the self-propelled option.

Additionally, the motorized grain scoop 20 may include a skid plate 110 on the body 22, and more specifically, on or near the bottom 98 of the body 22. The skid plate 110, as seen in FIG. 9, may prevent wear on other component on the motorized grain scoop 20, and may be changeable so that a worn skid plate 110 may be replaced with a new skid plate 110. The skid plate 110 may also aid the particulate matter being scooped in entering the cavity 32, as the skid plate 110 may create a smooth transition into the cavity 32 over the body 22.

In operation, the motorized grain scoop 20 may be used to move and or transfer particulate matter, including but not limited to, grain such as wheat, corn, etc., and other farm related products from a first location to a second location. In this exemplary embodiment, however, the grain scoop 20 will herein be described as being utilized to move grain in a grain repository to an exiting auger (not shown). The user may first place the motorized grain scoop 20 into the grain repository by lifting the grain scoop 20 using the handle 80 and/or the handle bar 92. As such, the user may have control of the motorized grain scoop 20, due to the placement of the handle 80 and the handle bar 92. The user may connect the motor 30 to an electrical source by connecting the electrical connector or cord 88, and more specifically, by plugging the electrical connector or cord 88 into an extension cord or other electrical source. By utilizing the controller/switch 82, the user may activate or deactivate the motor 30 and/or control the speed of the motor 30 during operation. Once the motor 30 has been activated, the rotational speed of the paddle assembly 28 may be in the range of 350 rpm to 525 rpm, and more specifically, may be at approximately 438 rpm so as not to crush or otherwise harm the particulate matter.

As the user causes the motorized grain scoop 20 to contact the grain, the grain will be scooped by the paddles 56 into the cavity 32 and will be thrown in a forwardly direction from the motorized grain scoop 20. Prior to the paddles 56 entering the cavity 32, the paddles 56 will engage and scoop the grain into the open region 78 of the paddle 56. More specifically, as seen in FIG. 9, the distal end 72 of the paddle 56 will contact the grain and begin scooping the grain with the rotation of the paddle assembly 28 into the cavity 32 and the open region 78. As the paddle 56 exits the cavity 32, the grain will traverse/slide along the bottom wall 70 until it reaches the distal end 72 of the paddle 56 and is thrown in a forwardly direction from the motorized grain scoop 20.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An apparatus for moving particulate matter, comprising:
   a body having a motor;
   a drive housing disposed on the body;
   a cavity disposed in the body, the cavity having a first side, a second side, and at least a partial semi-circular cross-sectional shape;
   a paddle assembly having a shaft and a plurality of paddles disposed therefrom, each paddle having a bottom wall and a distal end, wherein the distal end travels along the semi-circular cross-sectional shape of the cavity during operation, and the bottom wall extends along an entire width of the paddle between the first side wall and the second side wall of the cavity,
   wherein the bottom wall is arcuate about an axis parallel to the shaft, and
   wherein each paddle includes a pair of side walls that in combination with the bottom wall define an open region; and
   a drive mechanism disposed in the drive housing, the drive mechanism operatively connecting the motor and the shaft.

2. The apparatus for moving particulate matter of claim 1, wherein the bottom wall of the paddles is an arcuate bottom wall extending outwardly from the shaft first away from and then toward the direction of rotation of the paddles.

3. The apparatus for moving particulate matter of claim 2, wherein the open region has a measurable volume for receiving and throwing grain to a desired location.

4. The apparatus for moving particulate matter of claim 1, wherein the motor is an electric motor.

5. The apparatus for moving particulate matter of claim 1, further including a chute disposed on the body for guiding the particulate matter in a direction.

6. The apparatus for moving particulate matter of claim 1, wherein the paddle assembly rotates between 350 rpm and 525 rpm.

7. The apparatus for moving particulate matter of claim 1, wherein the body is constructed from a plastic material.

8. The apparatus for moving particulate matter of claim 1, wherein the particulate matter is grain.

9. An apparatus for moving particulate matter, comprising:
   a body having a motor;
   a drive housing disposed on the body;
   a cavity disposed in the body, the cavity having a first side, a second side, and at least a partial semi-circular cross-sectional shape;
   a paddle assembly having a shaft and a plurality of paddles disposed therefrom, each paddle having an arcuate bottom wall extending outwardly from the shaft, wherein the bottom wall is arcuate about an axis parallel to the shaft, a pair of side walls, and a distal end, wherein the side walls and the arcuate bottom wall define an open region and the distal end travels along the semi-circular cross-sectional shape of the cavity during operation; and
   a drive mechanism disposed in the drive housing, the drive mechanism operatively connecting the motor and the shaft.

10. The apparatus for moving particulate matter of claim 9, wherein the open region has a measurable volume for receiving and throwing grain to a desired location.

11. The apparatus for moving particulate matter of claim 9, wherein the motor is an electric motor.

12. The apparatus for moving particulate matter of claim 9, further including a chute disposed on the body for guiding the particulate matter in a direction.

13. The apparatus for moving particulate matter of claim 9, wherein the paddle assembly rotates between 350 rpm and 525 rpm.

14. The apparatus for moving particulate matter of claim 9, wherein the body is constructed from a plastic material.

15. The apparatus for moving particulate matter of claim 9, wherein the particulate matter is grain.

16. A portable apparatus for moving particulate matter, comprising:
   a body having a motor;
   a handle and at least one wheel operatively attached to the body to facilitate the moving the apparatus from a first to a second position;
   a cavity disposed in the body, the cavity having a semi-circular cross-sectional shape;
   a shaft disposed in the cavity;
   a drive mechanism operatively connecting the motor and the shaft;
   a motor housing disposed on the body;
   a drive housing disposed on the body that at least partially receives the drive mechanism; and
   a plurality of paddles disposed on the shaft, each paddle having an arcuate bottom wall, wherein the bottom wall is arcuate about an axis parallel to the shaft, a pair of side walls and a distal end, wherein the pair of side walls and the bottom wall define an open region and the distal end travels along the semi-circular cross-sectional shape of the cavity during operation.

17. The apparatus for moving particulate matter of claim 16, wherein the bottom wail is an arcuate bottom wall extending outwardly from the shaft first away from and then toward the direction of rotation of the paddles.

18. The apparatus for moving particulate matter of claim 17, wherein the an open region has a measurable volume for receiving and throwing grain to a desired location.

19. The apparatus for moving particulate matter of claim 16, wherein the motor is an electric motor.

20. The apparatus for moving particulate matter of claim 16, further including a chute disposed on the body for guiding the particulate matter in a direction.

21. The apparatus for moving particulate matter of claim 16, wherein the paddle assembly rotates between 350 rpm and 525 rpm.

22. The apparatus for moving particulate matter of claim 16, wherein the body is constructed from a plastic material.

23. The apparatus for moving particulate matter of claim 16, wherein the particulate matter is grain.

* * * * *

UNITED STATES PATENT AND TRADEMARK OFFICE
CERTIFICATE OF CORRECTION

| | |
|---|---|
| PATENT NO. | : 7,320,192 B2 |
| APPLICATION NO. | : 10/772811 |
| DATED | : January 22, 2008 |
| INVENTOR(S) | : Barry Algren |

Page 1 of 1

It is certified that error appears in the above-identified patent and that said Letters Patent is hereby corrected as shown below:

In the Claims:

At Column 8, line 23, "facilitate the moving the" should be --facilitate moving the--.

At column 8, line 45, "the an" should be --the--.

Signed and Sealed this

First Day of July, 2008

JON W. DUDAS
*Director of the United States Patent and Trademark Office*